Taylor & Towne,
Steam-Boiler Attachment.

Nº 49,170.  Patented Aug. 1, 1865.

Witnesses:
Theo Tusch
Wm. Kreurn

Inventor:
J. R. Taylor
H. A. Towne
By Munn & Co.
attys

UNITED STATES PATENT OFFICE.

JOSEPH R. TAYLOR AND HORACE A. TOWNE, OF CENTRALIA, ILLINOIS.

IMPROVEMENT IN CLOSING HAND-HOLE PLATES IN STEAM-BOILERS.

Specification forming part of Letters Patent No. 49,170, dated August 1, 1865.

*To all whom it may concern:*

Be it known that we, JOSEPH R. TAYLOR and HORACE A. TOWNE, of Centralia, in the county of Marion and State of Illinois, have invented a new and Improved Mode of Closing Hand-Holes in Steam-Boilers; and we do hereby declare that the following is a full, clear, and exact description thereof, which will enable those skilled in the art to make and use the same, reference being had to the accompanying drawings, forming part of this specification, in which—

Figure 1:
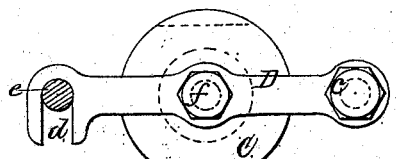
Figure 2:
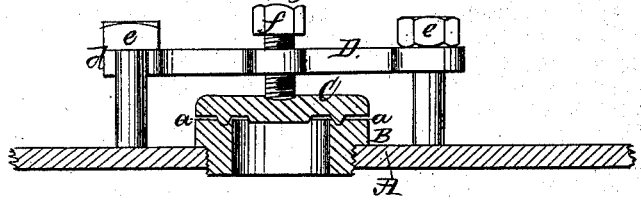
Figure 3:
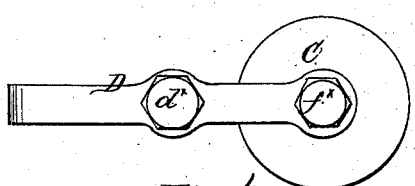
Figure 4:
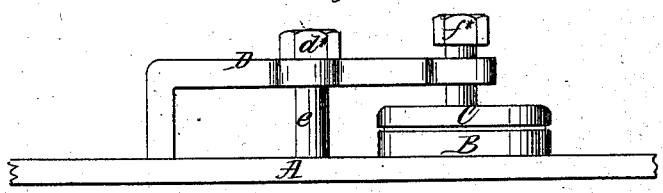

Figure 1 represents a plan or top view of this invention. Fig. 2 is a longitudinal vertical section of the same. Figs. 3 and 4 are modifications of the same.

Similar letters of reference indicate corresponding parts.

This invention consists in closing hand-holes in steam-boilers by means of a plug secured permanently in the boiler and bored out to give access to the interior of the same, in combination with a cap fitting on the surface of the plug with V or bell joint, and held down by a movable screw-clamp in such a manner that by taking off or releasing said screw-clamp the cap can be removed, and when the cap is replaced a tight joint can be produced without the use of india-rubber or other costly packing.

It is necessary that a locomotive or other steam-boiler should be washed out once per week, and in some cases, where the water is bad, still more frequently. By the old method of securing hand-hole covers a packing or rubber ring has to be used to produce a tight joint, and when once the joint is broken these rings are worthless. This arrangement causes a pecuniary loss. For instance, in an ordinary locomotive-boiler there are four hand-holes, and not unfrequently when the boiler is washed new rings are required. Furthermore, the rubber rings are sometimes blown out and the engine necessarily stopped until the joint is replaced.

In order to avoid these difficulties and disadvantages we secure in the boiler-plate A, a plug, B, of brass or any other suitable material, by a screw-thread or any other suitable means capable of producing a permanent and tight joint. The plug B is bored out with a hole large enough to admit the hand or to give access to the interior of the boiler, and its upper or outer surface is turned off smooth and provided with a V-shaped or semicircular groove, *a*, as shown in Fig. 2 of the drawings.

In order to close the hand-hole a cap, C, is put on it and secured in its place by a screw-clamp, D. The cap C is provided with a rim, *b*, which fits into the groove *a* in the surface of the plug, and when it is pressed down upon said surface a tight joint is produced without the use of packing of any kind. The joint can thus be made and unmade without requiring packing of any kind.

The clamp D consists of a bar which is hinged to a screw, *c*, secured in the plate A, and which is provided with a notch, *d*, to catch under the head of the screw *e*. A screw, *f*, passing down through the center of the bar presses on the cap C and holds the same down upon the surface of the plug B. The cap C can be readily removed by unfastening the screw *f* and turning the clamp off from over the cap, thereby saving much time and labor as well as expense for packing.

The modification represented in Figs. 3 and 4 we regard as the equivalent of our invention above described, the bar D being of L form, fitted to turn upon a screw, *d**, and provided with a screw, *f**, at its outer end to press the cap C down upon the annular plug B.

We claim as new and desire to secure by Letters Patent—

The plug B, inserted in the boiler-plate, in combination with the cap C and clamp D, substantially in the manner and for the purpose herein shown and described.

J. R. TAYLOR.
H. A. TOWNE.

Witnesses:
G. A. SANDERS,
W. J. A. DeLANCEY.